Patented Dec. 2, 1952

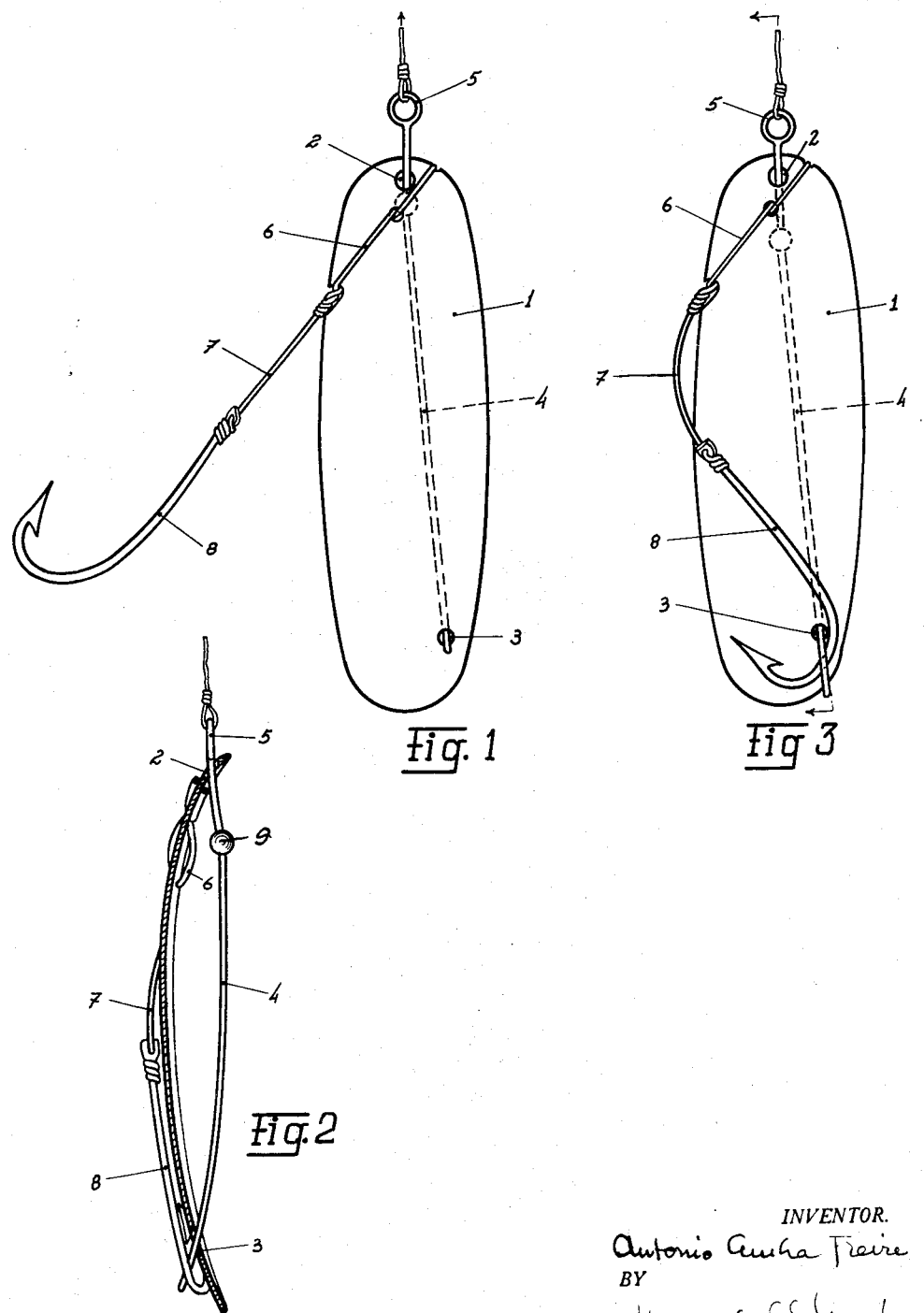

2,619,757

UNITED STATES PATENT OFFICE 2,619,757

FISHING APPARATUS

Antonio Cunha Freire, Sao Paulo, Brazil

Application September 21, 1950, Serial No. 186,010
In Brazil October 26, 1949

2 Claims. (Cl. 43—35)

The present invention relates to a fishing lure and hook, and more particularly to a resiliently tensioned hook attached to a spoon and released by trigger mechanism.

It is the object of the present invention to provide fishing lure which is provided with a tensioned hook which is released on the slightest touch, and is thrown with great force into the mouth of a fish whenever the fish strikes the spoon.

With this object in view the present invention mainly consists in a fishing lure comprising, in combination, a spoon having two holes, a stem passing through the holes, resiliently and frictionally engaging the spoon, and a resilient member member secured to the spoon extending at an acute angle to the stem and having a hook at the end thereof.

The resilient member is resiliently bendable to a tensioned position in which the hook engages the end portion of the stem and is released to move outwardly so as to strike a fish with great force when the spoon and the stem move relatively to each other.

The invention will be best understood from the following description of a specific embodiment when read in connection with the accompanying drawing, in which:

Fig. 1 is a front view of a fish member according to the present invention;

Fig. 2 is a side view of the same; and

Fig. 3 is a front view of the lure showing the resilient member in tensioned position.

Referring now to the drawings and more particularly to Fig. 1, an elongated spoon 1 is provided with a hole 2 adjacent to one end thereof, and another hole 3 adjacent to the other end thereof which is preferably located on one side of the longitudinal medial line of the spoon 1. A stem 4 passes through the holes 2 and 3 and slidably and frictionally engages the spoon. One end portion of the stem 4 is provided with an eye 5 to which the fishing line is secured.

A resilient member, extending at an acute angle to the longitudinal extension of the spoon 1, is secured to the same by means of a looped and twisted portion 6, and further comprises a resilient steel wire portion 7, and a hook 8 at the free end thereof.

Preferably the spoon 1 is slightly arched so that the stem 4 bridges the arch as can be best seen from Fig. 2 of the drawing.

Abutment means such as the small ball 9, are secured to the stem preventing the stem from sliding out of the hole 2 during relative movement of the spoon and the stem.

The device operates in the following manner:

The resilient member 7 is first bent from its normal position shown in Fig. 1 to a tensioned position shown in Fig. 3 in which the portion 7 is resiliently bent. In this position the end portion of the stem 4 is inserted into the hook 8 preventing the resilient member 7 to return to its normal position.

A fish striking the spoon 1 moves it relatively to the stem 4 which is held by the fishing line so that the hook 8 moving with the spoon 1 is released by the end portion of the stem 4 and moves outwardly to assume the position shown in Fig. 1, striking the mouth of the fish with great force.

While the invention has been illustrated and described as embodied in a fishing lure and hook it is not intended to be limited to the details shown since various structural changes may be made without departing from the spirit of the present invention.

What is claimed as new and desired to be secured by Letters Patent is:

1. A fishing lure comprising, in combination, an elongated curved spoon formed with two holes, one hole in each end portion thereof, said spoon forming an arc so that said holes are located substantially opposite each other; a stem passing through said holes resiliently and frictionally engaging said spoon and having in operative position a center portion bridging said arc and two end portions projecting through said holes to the outside of said arc, one end portion located at one end of said spoon being adapted to be secured to a fishing line; a resilient member secured at one end thereof to said one end of said spoon and extending in normal position thereof at an acute angle to said stem, said resilient member having a hook at the other end thereof and being resiliently bendable to a tensioned position located on the outside of said arc in which said hook engages the other end portion of said stem, said resilient member being released by said other end portion of said stem to move to said normal position when said spoon and said stem move relatively to each other to a releasing position in which the other end portion of said stem is located on the inside of said arc; and abutment means larger than said holes and fixed on said central portion of said stem.

2. A fishing lure comprising, in combination, an elongated curved spoon formed with two holes, one hole in each end portion thereof, said spoon forming an arc so that said holes are located substantially opposite each other; a stem passing through said holes resiliently and frictionally engaging said spoon and having in operative position a center portion bridging said arc and two end portions projecting through said holes to the outside of said arc, one end portion located at one end of said spoon being adapted to be secured to a fishing line, the hole through which the other end portion of said stem passes being located on one side of the longitudinally extending median line of said spoon; a resilient member secured at one end thereof to said one end of said spoon and extending in normal position thereof at an acute angle to said stem on the other side of said median line, said resilient member having a hook at the other end thereof and being resiliently bendable to a tensioned position located on the outside of said arc in which said hook engages the other end portion of said stem, said resilient member being released by said other end portion of said stem to move to said normal position when said spoon and said stem move relatively to each other to a releasing position in which the other end portion of said stem is located on the inside of said arc; and abutment means larger than said holes and fixed on said central portion of said stem.

ANTONIO CUNHA FREIRE.

REFERENCES CITED

The following references are of record in the file of this patent:

UNITED STATES PATENTS

| Number | Name | Date |
|---|---|---|
| 151,394 | Huard et al. | May 26, 1874 |
| 1,994,878 | Smith et al. | Mar. 19, 1935 |
| 2,415,633 | Hietala | Feb. 11, 1947 |

FOREIGN PATENTS

| Number | Country | Date |
|---|---|---|
| 9,315 | Sweden | Feb. 14, 1898 |